US011023426B1

(12) United States Patent
     Tkachuk

(10) Patent No.:     US 11,023,426 B1
(45) Date of Patent:      Jun. 1, 2021

(54) METHOD AND SYSTEM FOR DETECTION OF OPEN SOURCE WEB APPLICATION VERSION

(71) Applicant: Comodo Security Solutions, Inc., Clifton, NJ (US)

(72) Inventor: Dmitry Tkachuk, Odessa (UA)

(*) Notice: Subject to any disclaimer, the term of this patent is extended or adjusted under 35 U.S.C. 154(b) by 87 days.

(21) Appl. No.: 16/175,829

(22) Filed: Oct. 31, 2018

Related U.S. Application Data

(60) Provisional application No. 62/581,028, filed on Nov. 2, 2017.

(51) Int. Cl.
| | |
|---|---|
| *G06F 17/00* | (2019.01) |
| *G06F 16/18* | (2019.01) |
| *G06F 8/71* | (2018.01) |
| *H04L 9/32* | (2006.01) |
| *G06F 16/957* | (2019.01) |

(52) U.S. Cl.
CPC ............ *G06F 16/1873* (2019.01); *G06F 8/71* (2013.01); *G06F 16/957* (2019.01); *H04L 9/3239* (2013.01)

(58) Field of Classification Search
None
See application file for complete search history.

(56) References Cited

U.S. PATENT DOCUMENTS

| | | | | |
|---|---|---|---|---|
| 6,026,405 A * | 2/2000 | Arda | ...................... | G06F 16/10 |
| 6,536,037 B1 * | 3/2003 | Guheen | ..................... | G06F 8/71 |
| | | | | 703/2 |
| 7,460,021 B1 * | 12/2008 | Bacon | ..................... | G01W 1/00 |
| | | | | 340/601 |
| 9,165,124 B1 * | 10/2015 | Gurevich | .............. | H04L 67/303 |
| 9,202,084 B2 * | 12/2015 | Moore | .................. | G06F 16/958 |
| 2009/0199090 A1 * | 8/2009 | Poston | .................. | G06Q 10/10 |
| | | | | 715/255 |
| 2009/0293043 A1 * | 11/2009 | Begel | ........................ | G06F 8/71 |
| | | | | 717/122 |
| 2010/0082813 A1 * | 4/2010 | Li | .......................... | H04L 67/16 |
| | | | | 709/226 |
| 2015/0242434 A1 * | 8/2015 | Wollenstein | .......... | G06F 16/285 |
| | | | | 707/749 |
| 2016/0125111 A1 * | 5/2016 | Yu | ....................... | G06F 30/3323 |
| | | | | 716/106 |
| 2017/0075781 A1 * | 3/2017 | Bennett, Jr. | ........... | G06F 3/0619 |
| 2018/0052682 A1 * | 2/2018 | Fox | ........................... | G06F 8/71 |

\* cited by examiner

*Primary Examiner* — Hasanul Mobin
(74) *Attorney, Agent, or Firm* — Joseph P. Aiena

(57) ABSTRACT

There is provided a method and system for effective detection of web application version which uses such a data set that allows with minimal number of queries to web server to detect version of web application installed on it. The method is based on calculation of check sum of files and sorting them so that the most frequently changing from version to version files are checked first. In parallel, a lot of potentially suitable versions are stored and with each request to the server the set is shortened until no elements remain. Web server answers which do not match any of pre-calculated hash sums are stored for further processing in order to complement existing database of versions.

9 Claims, 11 Drawing Sheets

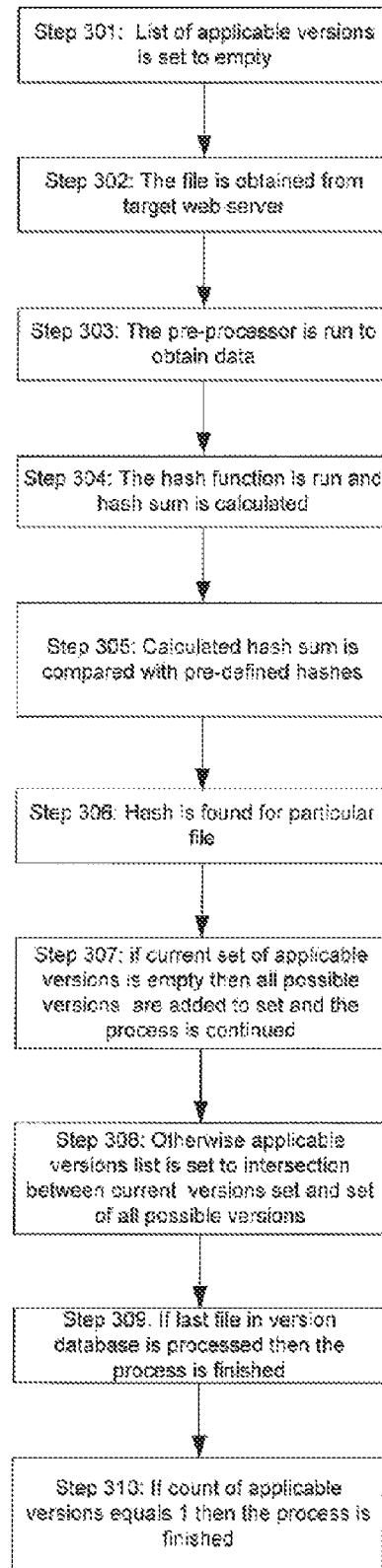

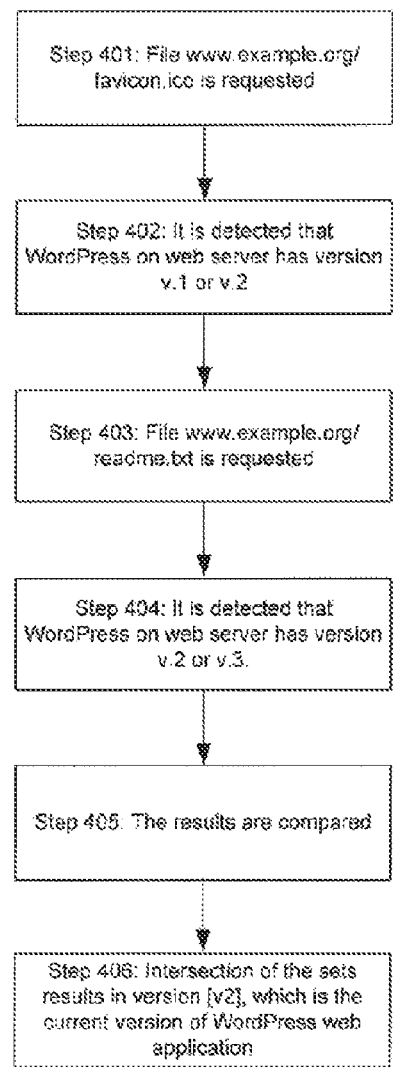

METHOD AND SYSTEM FOR DETECTION OF OPEN SOURCE WEB APPLICATION VERSION

CROSS REFERENCE TO RELATED APPLICATIONS

This application claims benefit of and priority to U.S. Provisional Application Ser. No. 62/581,028 filed on Nov. 2, 2017, which is incorporated herein by reference in its entirety.

BACKGROUND

Application version detection tool can be used for various task solving. It can be applied for web application security audit to build potential threats list basing on version ID. Or with its help there can be composed a list of recommendations to update installed software for the web site owner/administrator. Also, it can detect source web application in proprietary software and serve as a copyright infringement detection tool.

Though all previously used automated methods are signature based. They are accessing particular predefined addresses and trying to extract version number from the page source. But version ID could be removed from the application sources, or replaced by incorrect value. Files disclosing version number which do not produce any useful job (e.g. "readme.html", "changelog.txt"), can be completely removed or access can be limited to them. Such simple actions block ability of signature based methods to detect version for web applications.

Thus, there is need in new method and system for effective detection of web application version that would not be dependent on provided by website owner information.

SUMMARY OF THE INVENTION

The present invention discloses method and system to detect version of application installed on web server by using such a data set that allows to implement that with minimal number of queries to web server. It is supposed that source codes of all versions are stored in repository and available. The method is based on calculation of check sum of files and sorting them so that the most frequently changing from version to version files are checked first. In parallel, a lot of potentially suitable versions are stored and with each step (request to the server) the set is shortened till no elements left. Web server answers which do not match any of pre-calculated hash sums can be stored for further processing in order to complement existing database of versions.

The method can be also applied for detection of source web application in proprietary software or as copyright infringement detection tool.

BRIEF DESCRIPTION OF DRAWINGS

FIG. 3 is a flowchart of other embodiment of the invention where the version checker forms the set of versions which can match target web application version.
FIG. 4 is a flowchart of other embodiment of the invention where the version of WordPress on www.example.org site is detected.

DETAILED DESCRIPTION

The current invention is a method and system that uses such a data set that allows with minimal number of queries to web server to detect version of web application installed on it. The method is based on calculation of check sum of files and sorting them so that the most frequently changing from version to version files are checked first. In parallel, a lot of potentially suitable versions are stored and with each step (request to the server) the set is shortened till no elements left.

Figure 1:
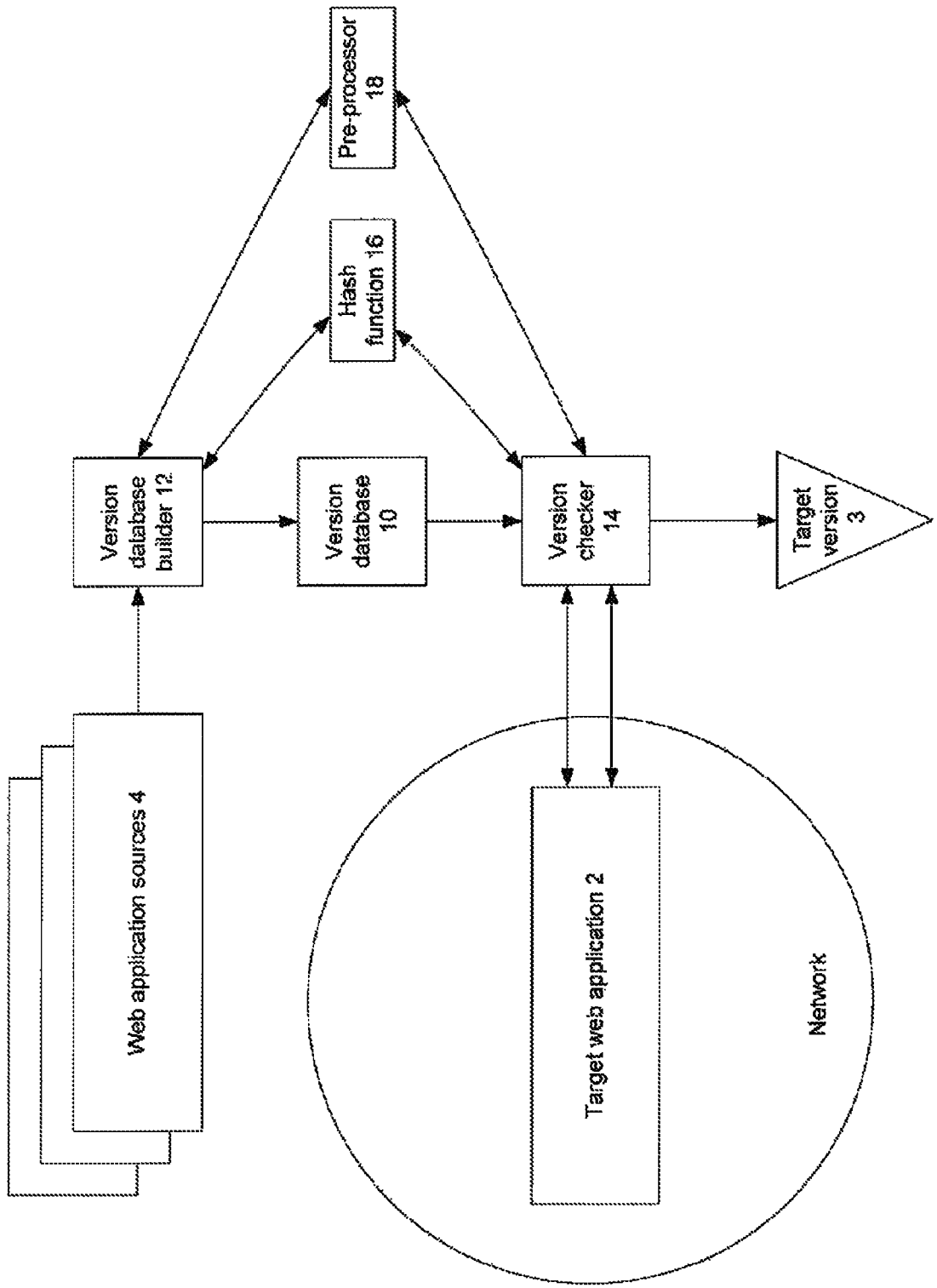
FIG. 1 is a depiction of elements of the invention.
Figure 2A:
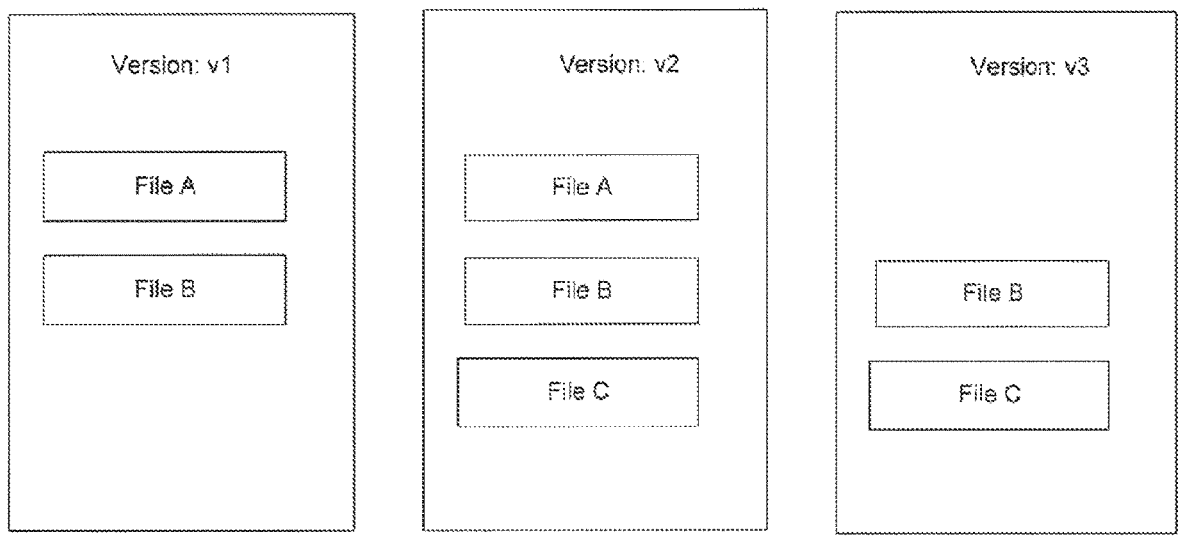
FIG. 2A is a depiction of one embodiment of the invention where sources of web application are detected and ordered version database file is formed.
Figure 2B:
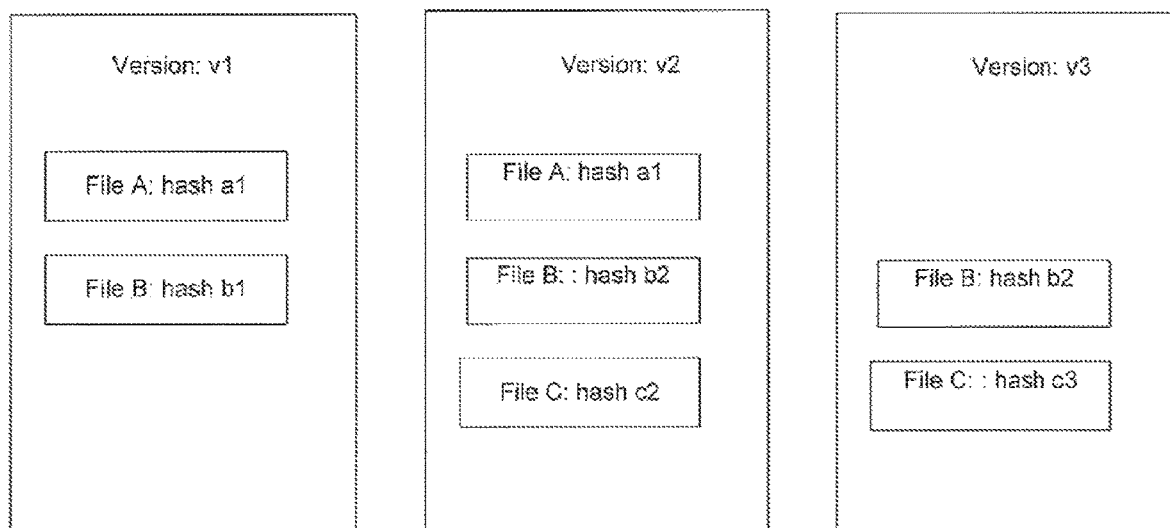
FIG. 2B is a depiction of one embodiment of the invention where sources of web application are detected and ordered version database file is formed.
Figure 2C:
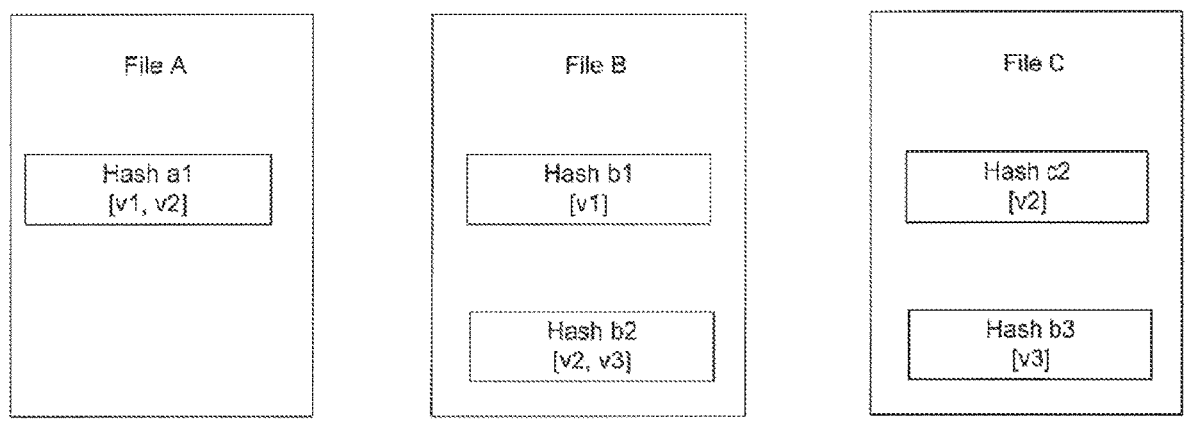
FIG. 2C is a depiction of one embodiment of the invention where sources of web application are detected and ordered version database file is formed.
Figure 2D:
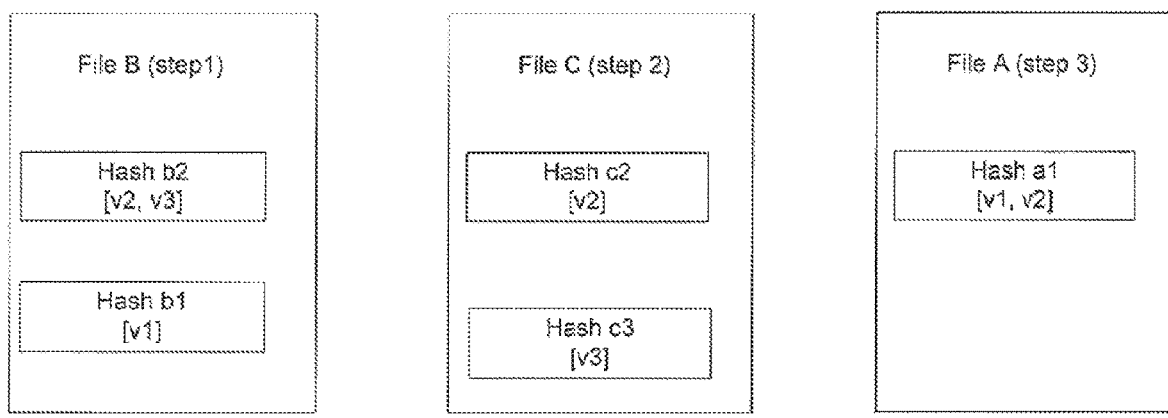
FIG. 2D is a depiction of one embodiment of the invention where sources of web application are detected and ordered version database file is formed.
Figure 2E:
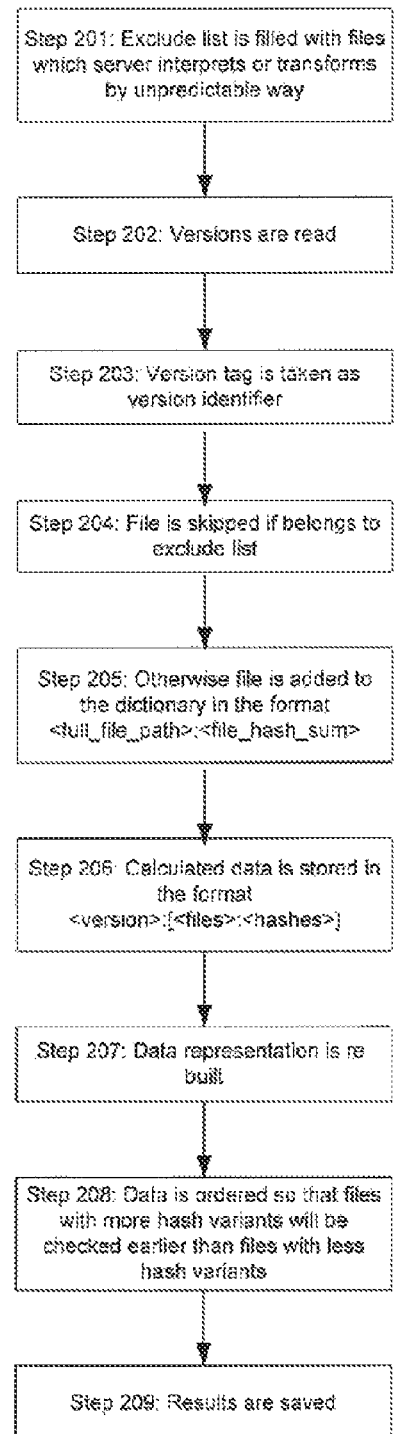
FIG. 2E is a flowchart of one embodiment of the invention where sources of web application are detected and ordered version database file is formed.

FIG. 1 shows depiction of elements of the invention. There is a target web application 2 which is accessible over HTTP, target version 3 of it should be obtained finally at end of the process. That is, as a result of applying the method of the present invention, the version of the web application is determined. Web application sources 4 of all available versions of target web application 2 are grouped by version tag 6. Original filenames of web application sources 4, corresponding check-sums 8 and versions of these files are stored in version database 10. For building version database 10 there is used application named versions database builder 12 which processes web application sources 4. The application named version checker 14 uses version database 10 to identify version of target web application 2. Hash function 16 can be embedded into version database 10 and is presented by any hashing function which provides acceptable uniqueness of generated hash-sums, SHA1 would be enough for most web applications. Pre-processor 18 can be also embedded into version database 10; it prepares data for hashing, removing/changing various system-dependent information like format of line-endings, comments and other data which does not change code execution flow.

FIG. 2A, FIG. 2B, FIG. 2C, FIG. 2D, and FIG. 2E show depictions and flowchart of one embodiment of the invention where sources of web application 4 are detected and ordered version database file is formed. This file consequentially describes list of accessible files in correspondence to hashes and sets of possible application versions. Web application sources 4 should cover as many versions as possible, all possible versions in ideal case. Source codes should be grouped by version tag 6, one version is for one folder, e.g.: 0.9, 1.0-RC1, 1.0, 1.01. In step 201 an exclude list is filled with files/type of files which server interprets or transforms by unpredictable way, e.g. PHP, CGI files. In step 202 versions are read. For each version tag folder the following procedures are done (steps 203-206). In step 203 the version tag 6 is taken as version identifier. For each file of particular version of web application, step 204, it is necessary to skip file if it belongs to the exclude list, or add file to the dictionary in the format <full_file_path>:<file_hash_sum>, step 205. In step 206 calculated data is stored in the format <version>:[<files>:<hashes>]. In step 207 the data representation is re-built in the following way—# input: versions: [filenames:hash], # output: filenames:[hashes:[versions]]. In step 208 the data is ordered so that: files with more hash variants will be checked earlier than files with less hash variants and hashes which correspond to more variants will be checked before hashes corresponding to less variants. In step 209, results are saved.

FIG. 3 shows a flowchart of other embodiment of the invention where the version checker 14 forms the set of versions which can match target web application version. Set can be empty, can contain one element or can contain many elements. In step 301 the list of applicable versions is set to empty. Further for each file in version database 10 the following procedures are done. In step 302 the file is obtained from target web server. In step 303 the pre-processor 18 is run to obtain data. In step 304 the hash function 16 is run and hash sum is calculated. In step 305 calculated hash sum is compared with pre-defined in version database 10 hashes. In step 306 hash is found for particular file. In step 307 if current set of applicable versions is empty then all possible versions corresponding to the calculated hash are added to set and the process is continued. Otherwise, in step 308, applicable versions list is set to intersection between current applicable versions set and set of all possible versions corresponding to the calculated hash. In step 309 if last file in version database is processed then the process is finished. In step 310 if count of applicable versions equals 1 then the process is finished. Checking files which potentially will not decrease number of applicable versions can be skipped in order to decrease requests count and execution time. Version checker 14 should be able to identify HTTP/application errors in responses in order to skip processing results of such requests.

FIG. 4 shows flowchart of other embodiment of the invention where the version of WordPress on www.example.org site is detected. In step 401 the file www.example.org/favicon.ico is requested. If the check-sum 8 of this file is X1, then the version will be one of [v.1,v.2]; and if the checksum 8 is X2, the version will be one of [v.3]. As a result, step 402, the checksum 8 equals X1, so it is detected that WordPress on web server has version v.1 or v.2. In step 403 the file www.example.org/readme.txt is requested. If the checksum 8 of this file is Y1, then the version will be one of [v.2,v.3]; and if the checksum 8 is Y2, the version will be one of [v.3]. As a result, step 404, the checksum 8 equals Y1, so it is detected that WordPress on web server has version v.2 or v.3. In step 405 the results are compared. In the first iteration there was received the set of versions [v1,v2], in the second iteration the set [v2,v3]. In step 406 it is determined that intersection of the sets results in version [v2], which is the current version of WordPress web application.

Figure 5:
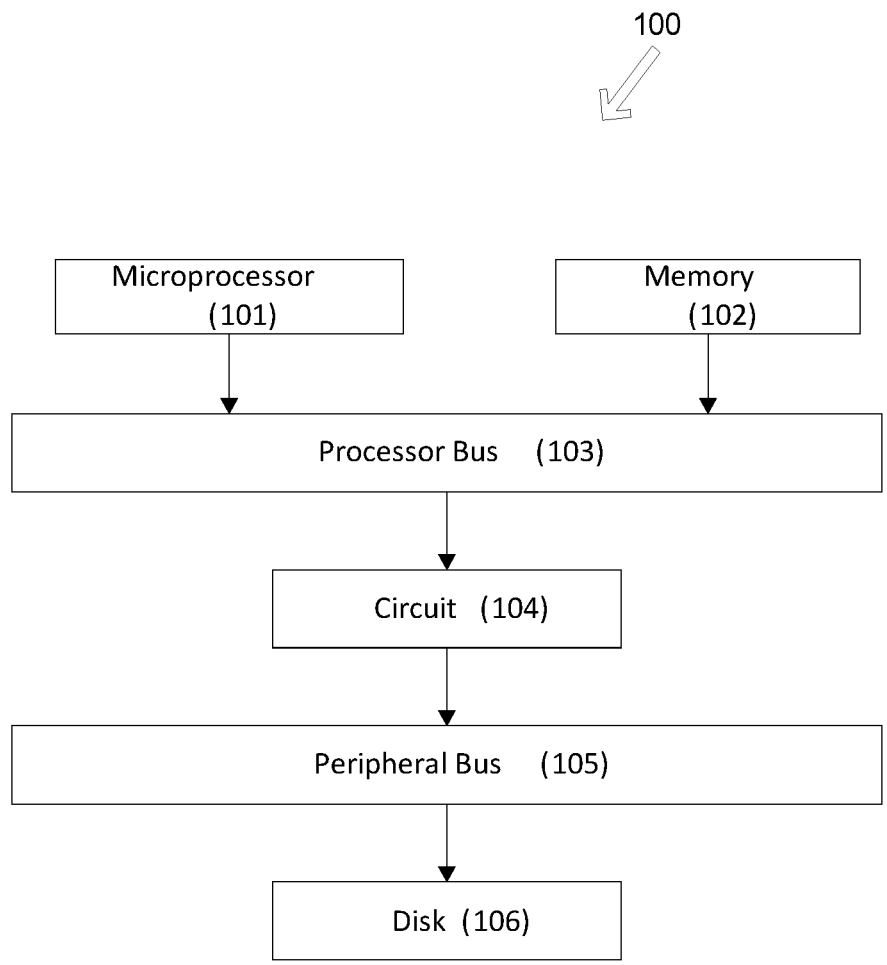
FIG. 5 is a schematic illustration of the connections of a computing system.
Figure 6:
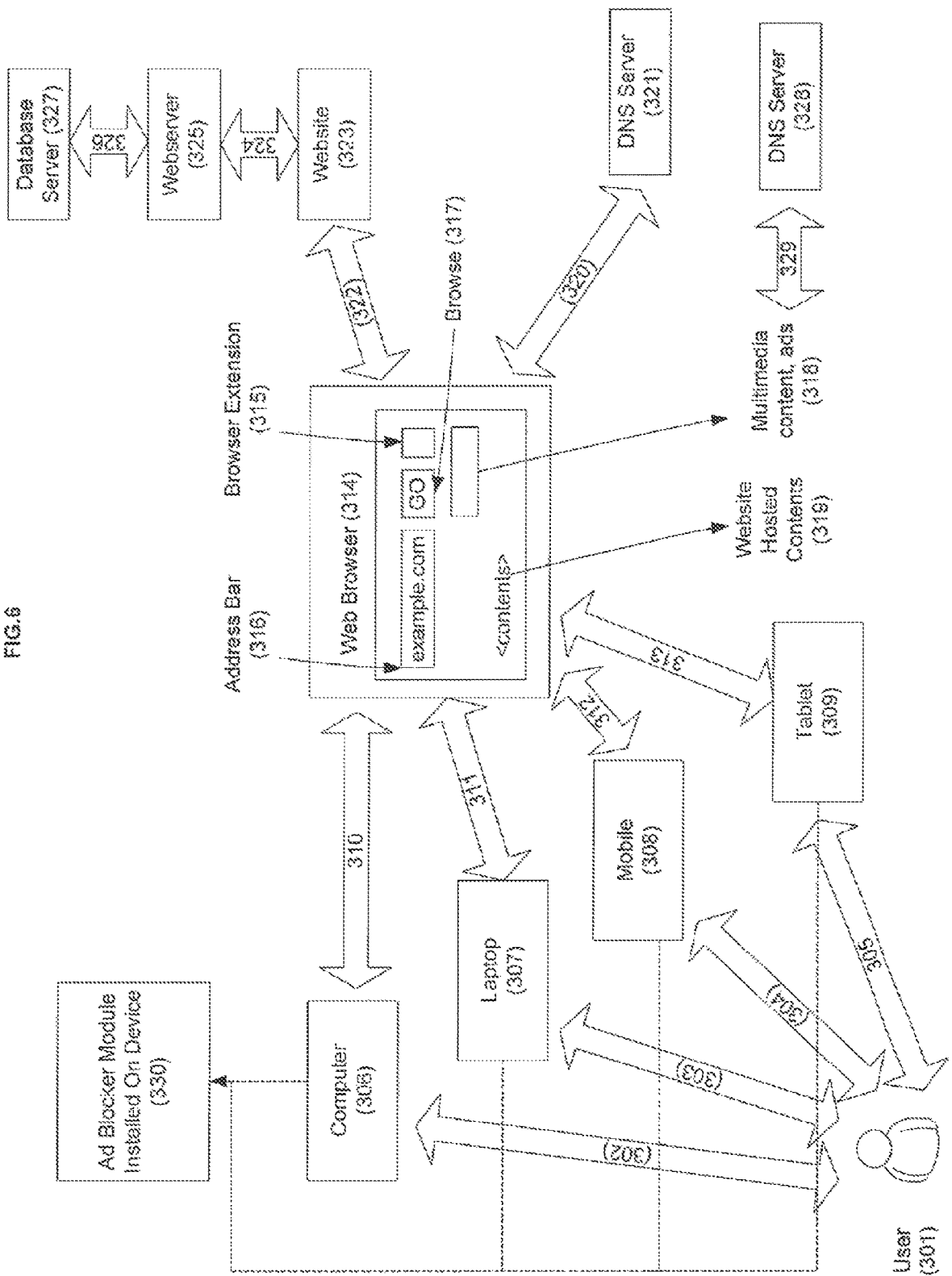
FIG. 6 is a schematic illustration showing how a user browses Internet and how different components act together to complete that browsing experience.
Figure 7:
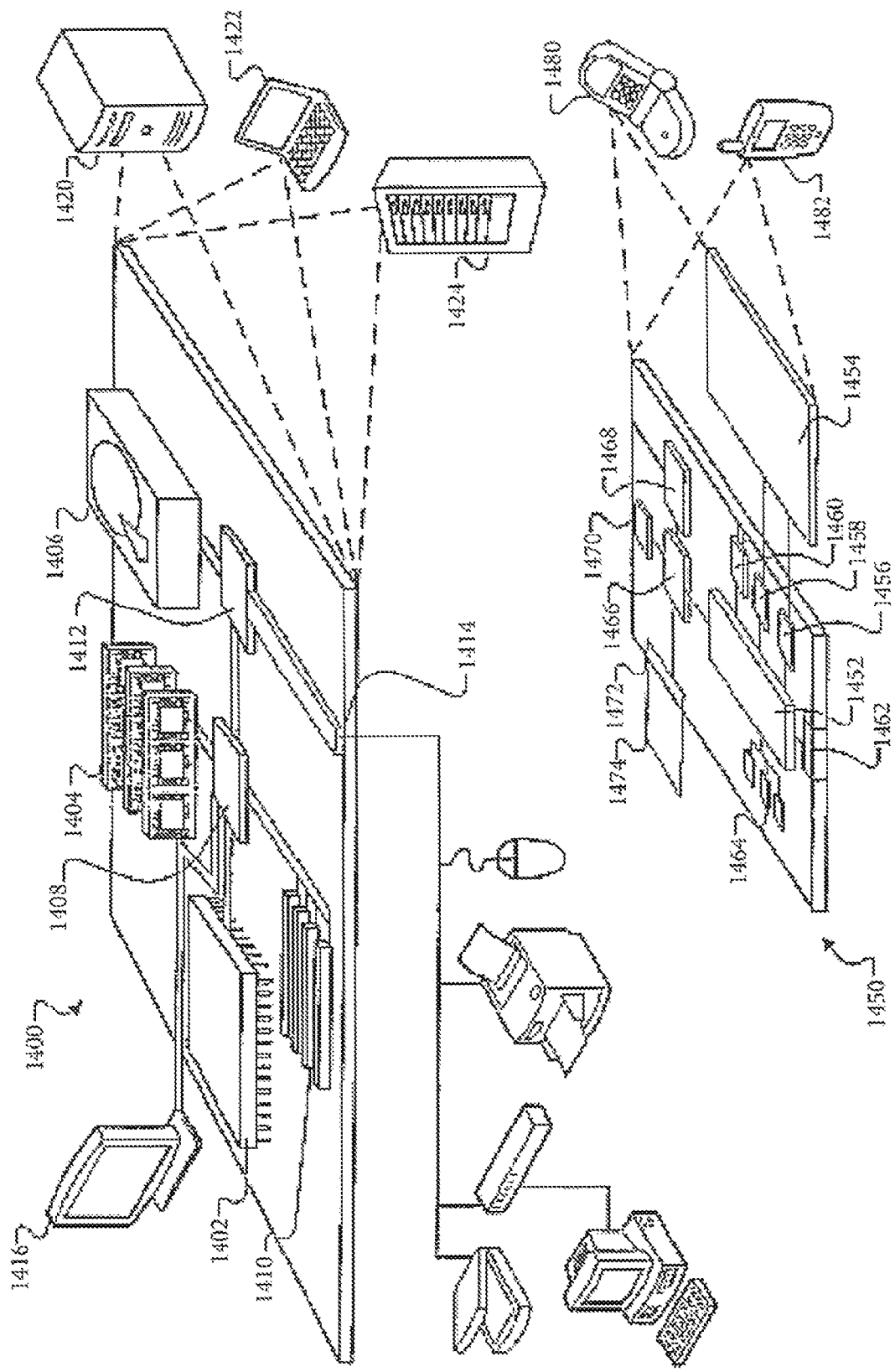
FIG. 7 is an illustration of a computer and mobile devices and their components.

The present invention is used with the following FIGS. 5, 6, and 7 of computer systems, components, and internet access. FIG. 5 illustrates a system of a computer or device which includes a microprocessor 101 and a memory 102 which are coupled to a processor bus 103 which is coupled to a peripheral bus 105 by circuitry 104. The bus 105 is communicatively coupled to a disk 106. It should be understood that any number of additional peripheral devices are communicatively coupled to the peripheral bus 105 in embodiments of the invention. Further, the processor bus 103, the circuitry 104 and the peripheral bus 105 compose a bus system for computing system 100 in various embodiments of the invention. The microprocessor 101 starts disk access commands to access the disk 106. Commands are passed through the processor bus 103 via the circuitry 104 to the peripheral bus 105 which initiates the disk access commands to the disk 106. In various embodiments of the invention, the present system intercepts the disk access commands which are to be passed to the hard disk.

FIG. 6 is a description of how communication works when the web is browsed and shows that a user (301) can use computer (306), laptop (307), mobile (308) or a tablet (309) to launch a web browser (314) installed on that specific device to browse a specific website (323). The user can enter an address of some chosen web site on the address bar (316) and press a browser specific option to indicate to the browser to browse, as shown in FIG. 5 via button "Go" (317). After a user presses a browser specific option to navigate to a given web page as shown in FIG. 5 via button Go (317), web browser (314) first connects to domain name server (321) as configured in that device to resolve the web site domain to the IP address. Any user initiated request in browser page goes through to web site (323) as show via flow arrow 322 and then to web server (325) where web site (323) is hosted. Web server (325) in turn may connect to one or more database server(s) (327) to return specific user requested contents back to web browser (314). Multimedia content and advertisements (318) are received from server 328 as shown by flow arrow 329.

In FIG. 6, browser extension (315) is shown to be installed in web browser that has capability to block any outgoing web request; and at the same time can block any html element present on web page using some pre-defined blacklist of outgoing URLs. At the same time a device may also be using one or other ad blocker (330) installed on device that can block any outgoing call irrespective of application calling and thus such an application can block ad requests originating from any application including web browsers. Considering such ad blockers (330) are installed on device, they have complete access to all code passed onto web page and can inject any specific piece of html code that can block any HTML elements present on web page. Thus, depending on device setup, a web request may be blocked at browser level via ad blocker installed as browser extension (315) or may be blocked at network level using software module installed on device at network level and acting as ad blocker (330).

FIG. 7 shows an example of a computer device 1400 and a mobile computer device 1450, which may be used to implement the processes described herein, including the mobile-side and server-side processes for installing a computer program from a mobile device to a computer. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412 are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple busses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port 1414, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468 are interconnected using various busses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provided in communication with processor 1452, so as to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provided as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, memory on processor 1452, or a propagated signal that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, Wi-Fi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smartphone 1482, personal digital assistant, tablet, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "computer readable storage medium" may be any tangible medium (but not a signal medium—which is defined below) that can contain, or store a program. The terms "machine readable medium," "computer-readable medium," or "computer readable storage medium" are all non-transitory in their nature and definition.

Non-transitory computer readable media comprise all computer-readable media except for a transitory, propagating signal.

The term "machine-readable signal" refers to any signal used to provide machine instructions and/or data to a programmable processor. A "computer readable signal medium" may be any computer readable medium that is not a computer readable storage medium and that can communicate, propagate, or transport a program.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. A method for detection of open source web application version comprising:
   obtaining a target web application which is a web application accessible over HTTP;
   grouping by version tag, web application sources of all available versions of target web application grouped;
   storing, by ordered version database, original filenames of web application sources, corresponding check-sums and versions of these files;
   presenting version database builder as an application for processing web application sources in order to build version database;
   presenting version checker as an application which uses said version database to identify version of target web application;
   presenting hash function by any hashing function which provides acceptable uniqueness of generated hash-sums and said hash function can be embedded into said version database;
   preparing data, by pre-processor for hashing, removing various system-dependent information including format of line-endings, comments and other data which does not change code execution flow, said pre-processor embedded into said version database;
   where sources of web application are detected and ordered version database file is formed comprising:
   filling exclude list with files/type of files which server interprets or transforms by unpredictable way;
   reading versions;
   taking the version tag as version identifier;
   skipping file if it belongs to the exclude list or adding file to the dictionary in the format <fullfilepath>:<file_hash_sum> for each file of particular version of web application;
   storing calculated data in the format <version>:[<files>:<hashes>];
   rebuilding the data representation as: # input: versions: [filenames:hash], # output: filenames: [hashes: [versions]];
   storing the data so that files with more hash variants are checked earlier than files with less hash variants and hashes which correspond to more variants are checked before hashes corresponding to less variants;
   saving results.

2. The method for detection of open source web application version according to claim 1, where ordered version database file consequentially describes list of accessible files in correspondence to hashes and sets of possible application versions.

3. The method for detection of open source web application version according to claim 1, where application sources cover as many versions as possible, all possible versions in ideal case.

4. The method for detection of open source web application version according to claim 1, where source codes are grouped by version tag so that one version corresponds to one folder.

5. A method for detection of open source web application version comprising:
   obtaining a target web application which is a web application accessible over HTTP;
   grouping by version tag, web application sources of all available versions of target web application grouped;
   storing, by ordered version database, original filenames of web application sources, corresponding check-sums and versions of these files;
   presenting version database builder as an application for processing web application sources in order to build version database;
   presenting version checker as an application which uses said version database to identify version of target web application;
   presenting hash function by any hashing function which provides acceptable uniqueness of generated hash-sums and said hash function can be embedded into said version database;
   preparing data, by pre-processor for hashing, removing various system-dependent information including format of line-endings, comments and other data which does not change code execution flow, said pre-processor embedded into said version database;
   where the version checker forms the set of versions which can match said target web application version comprising:
   setting empty the list of applicable versions;
   obtaining file from target web server;
   running pre-processor to obtain data;
   running hash function and calculating hash sum;
   comparing calculated hash sum with pre-defined in version database hashes;
   finding hash for particular file;
   adding all possible versions corresponding to the calculated hash if current set of applicable versions is empty;
   otherwise setting applicable versions list to intersection between current applicable versions set and set of all possible versions corresponding to the calculated hash;
   finishing process if the last file in version database is processed;
   finishing process if count of applicable versions equals 1.

6. The method for detection of open source web application version according to claim 5, where checking files which potentially do not decrease number of applicable versions is skipped in order to decrease requests count and execution time.

7. The method for detection of open source web application version according to claim 5, where version checker is able to identify HTTP/application errors in responses in order to skip processing results of such requests.

8. The method for detection of open source web application version according to claim 1 wherein the step of preparing data, by pre-processor for hashing includes changing various system-dependent information like format of line-endings, comments and other data which does not change code execution flow, said pre-processor embedded into said version database.

9. The method for detection of open source web application version according to claim 5 wherein the step of preparing data, by pre-processor for hashing includes changing various system-dependent information including format of line-endings, comments and other data which does not change code execution flow, said pre-processor embedded into said version database.

* * * * *